United States Patent
Yamane et al.

(10) Patent No.: US 10,430,628 B2
(45) Date of Patent: Oct. 1, 2019

(54) SLIP PROCESSING DEVICE, SLIP PROCESSING METHOD, AND RECORDING MEDIUM

(71) Applicant: CASIO COMPUTER CO., LTD., Tokyo (JP)

(72) Inventors: Kazuyasu Yamane, Tokyo (JP); Teppei Moriyama, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/641,557

(22) Filed: Jul. 5, 2017

(65) Prior Publication Data
US 2018/0082098 A1    Mar. 22, 2018

(30) Foreign Application Priority Data

Sep. 20, 2016 (JP) .................................. 2016-183013
May 25, 2017 (JP) .................................. 2017-103434

(51) Int. Cl.
*G06K 7/10* (2006.01)
*G06K 7/14* (2006.01)
*G06K 17/00* (2006.01)

(52) U.S. Cl.
CPC ....... *G06K 7/1439* (2013.01); *G06K 7/10762* (2013.01); *G06K 7/1413* (2013.01); *G06K 17/00* (2013.01)

(58) Field of Classification Search
CPC .......... G06K 7/10762; G06K 7/10772; G06K 7/10782; G06K 7/1404; G06K 7/1413;
(Continued)

(56) References Cited

U.S. PATENT DOCUMENTS 5,521,368 A *  5/1996  Adachi ................ G06K 7/1093
                                                 235/462.08
7,334,729 B2 *  2/2008  Brewington .......... G06Q 30/06
                                                 235/383
(Continued)

FOREIGN PATENT DOCUMENTS

JP    H3-209585 A    9/1991
JP    H7-085253 A    3/1995
(Continued)

OTHER PUBLICATIONS

European Search Report dated Mar. 5, 2018, in a counterpart European patent application No. 17180537.7.
(Continued)

*Primary Examiner* — Thien M Le
*Assistant Examiner* — April A Taylor
(74) *Attorney, Agent, or Firm* — Chen Yoshimura LLP

(57) ABSTRACT

A slip processing device includes: an imaging unit that images an object; a barcode scanner that reads a barcode; and a processor configured to perform the following: causing the barcode scanner to scan a barcode on a slip to obtain an identification information on the slip; determining whether the obtaining of the identification information has succeeded; when the obtaining of the identification information has succeeded, causing the imaging unit to image the slip to obtain a slip image; and causing the identification information that has been obtained and the slip image that has been obtained to be stored in association with each other in a storage unit.

16 Claims, 14 Drawing Sheets

(58) Field of Classification Search
CPC ... G06K 7/1417; G06K 7/1426; G06K 7/1439
See application file for complete search history.

(56) References Cited

U.S. PATENT DOCUMENTS

| | | |
|---|---|---|
| 2003/0127519 A1 | 7/2003 | Ehrhart et al. |
| 2007/0183688 A1* | 8/2007 | Hollfelder ............ G06Q 10/10 382/305 |
| 2008/0309960 A1 | 12/2008 | Kinoshita |
| 2014/0140585 A1 | 5/2014 | Wang |

FOREIGN PATENT DOCUMENTS

| | | |
|---|---|---|
| JP | H11-349114 A | 12/1999 |
| JP | 2005-275530 A | 10/2005 |
| JP | 2013-103163 A | 5/2013 |

OTHER PUBLICATIONS

Japanese Office Action dated Jul. 9, 2019, in a counterpart Japanese patent application No. 2017-103434. (A machine translation (not reviewed for accuracy) attached.).

* cited by examiner

SLIP PROCESSING DEVICE, SLIP PROCESSING METHOD, AND RECORDING MEDIUM

BACKGROUND OF THE INVENTION

Technical Field

The present invention relates to a slip processing device, slip processing method, and recording medium.

Background Art

Handy terminals are one well-known type of business data collection device. A handy terminal typically includes a barcode scanner and a camera and obtains, from various types of slips, identification information included in barcodes printed on the slip as well as an image of the slip obtained by the camera.

One conventional data management method for associating identification information included in barcodes printed on the slips with image data obtained by using the camera to image the slips involves using the barcode scanner to read the barcode and obtain the identification information, using the camera to image the target object, and then associating and saving the identification information and image data (see Japanese Patent Application Laid-Open Publication No. H11-349114, for example).

SUMMARY OF THE INVENTION

However, this conventional management method requires two separate actions: reading the barcode and then imaging the target object. Therefore, data management for large numbers of slips requires a large amount of time and labor. Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a handheld device for slip processing, including: an imaging unit that images an object; a barcode scanner that reads a one-dimensional barcode; a storage unit; and a processor configured to perform the following: causing the barcode scanner to scan a one-dimensional barcode on a slip to obtain identification information on the slip; determining whether the obtaining of the identification information has succeeded; when the obtaining of the identification information has succeeded, causing the imaging unit to image the slip to obtain a slip image; and causing the identification information that has been obtained and the slip image that has been obtained to be stored in association with each other in the storage unit.

In another aspect, the present disclosure provides a slip processing method to be performed by a handheld device for slip processing that includes an imaging unit that images an object; a barcode scanner that reads a one-dimensional barcode; a storage unit; and a processor, the slip processing method including, via the processor: causing the barcode scanner to scan a one-dimensional barcode on a slip to obtain identification information on the slip; determining whether the obtaining of the identification information has succeeded; after the obtaining of the identification information has succeeded, causing the imaging unit to image the slip to obtain a slip image; and storing the identification information that has been obtained and the slip image that has been obtained in association with each other in the storage unit.

In another aspect, the present disclosure provides non-transitory computer-readable recording medium having stored therein instructions executable by a processor in a handheld device for slip processing, the handheld device including an imaging unit that images an object; a barcode scanner that reads a one-dimensional barcode; a storage unit; and the processor, the instructions causing the processor to perform the following: causing the barcode scanner to scan a one-dimensional barcode on a slip to obtain identification information on the slip; determining whether the obtaining of the identification information has succeeded; after the obtaining of the identification information has succeeded, causing the imaging unit to image the slip to obtain a slip image; and storing the identification information that has been obtained and the slip image that has been obtained in association with each other in the storage unit.

It is to be understood that both the foregoing general description and the following detailed description are exemplary and explanatory, and are intended to provide further explanation of the invention as claimed.

DETAILED DESCRIPTION OF EMBODIMENTS

Figure 1:
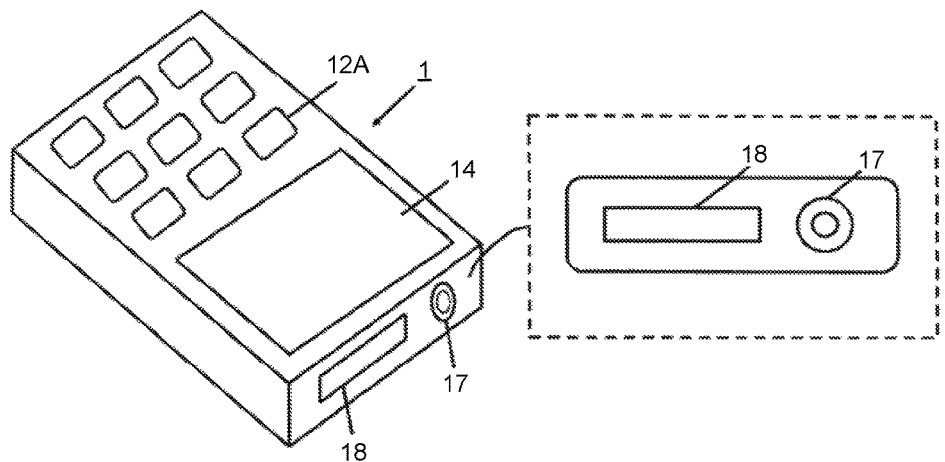
FIG. 1 schematically illustrates a configuration of a slip processing device.

Embodiments of the present invention will be described in detail below with reference to the attached drawings. It should be noted that the present invention is not limited to the examples illustrated in the drawings.

Embodiment 1

Next, a slip processing device 1 according to Embodiment 1 will be described with reference to FIGS. 1 to 3. Next, a slip processing device 1 according to Embodiment 1 will be described with reference to FIG. 1. FIG. 1 schematically illustrates a configuration of the slip processing device 1.

The slip processing device 1 is a handy terminal of the type illustrated in FIG. 1, for example, and includes operation keys 12A, a display unit 14, an imaging unit 17, and a scanner 18. Note, however, that the slip processing device 1 is not limited to being a handy terminal and may be another type of information device such as a smartphone, a tablet personal computer (PC), a notebook PC, or a personal digital assistant (PDA).

The operation keys 12A are a keypad for receiving input operations and allow the user to input the required operations when processing slips. Here, "input operations" include entering numbers and text as well as trigger inputs for scanning with the scanner 18 or obtaining images with the imaging unit 17, for example.

The display unit 14 is a liquid crystal display (LCD), an electroluminescent display (ELD), or the like and displays information required to process slips to the user. Moreover, the display unit 14 may include a resistive or capacitive touch panel, for example, and may thus be configured to also accept input operations.

The imaging unit 17 is a digital camera capable of obtaining static images. The imaging unit 17 includes a lens, an image sensor, various other sensors, an analog processor, and a digital processor and makes it possible to obtain an image of a subject by focusing a subject image from the imaging lens onto the image sensor.

The scanner 18 is a laser scanner for reading one-dimensional barcodes and includes a light emitter, a light receiver, a gain circuit, and a binarization circuit. More specifically, barcodes are irradiated with a beam of light emitted from the light emitter, and the reflected light is then received by the light receiver and converted to an electrical signal. The gain circuit then amplifies the electrical signal, which is then converted to binary data by the binarization circuit and output.

Moreover, the imaging direction of the imaging unit 17 and the laser emission direction of the scanner 18 are set to be in the same direction. Therefore, in a handy terminal such as that illustrated in FIG. 1, for example, the imaging unit 17 and the scanner 18 may be mounted on the same face of the device.

Next, the physical configuration of the slip processing device 1 will be described with reference to FIG. 2. FIG. 2 illustrates the physical configuration of the slip processing device 1.

Figure 2:
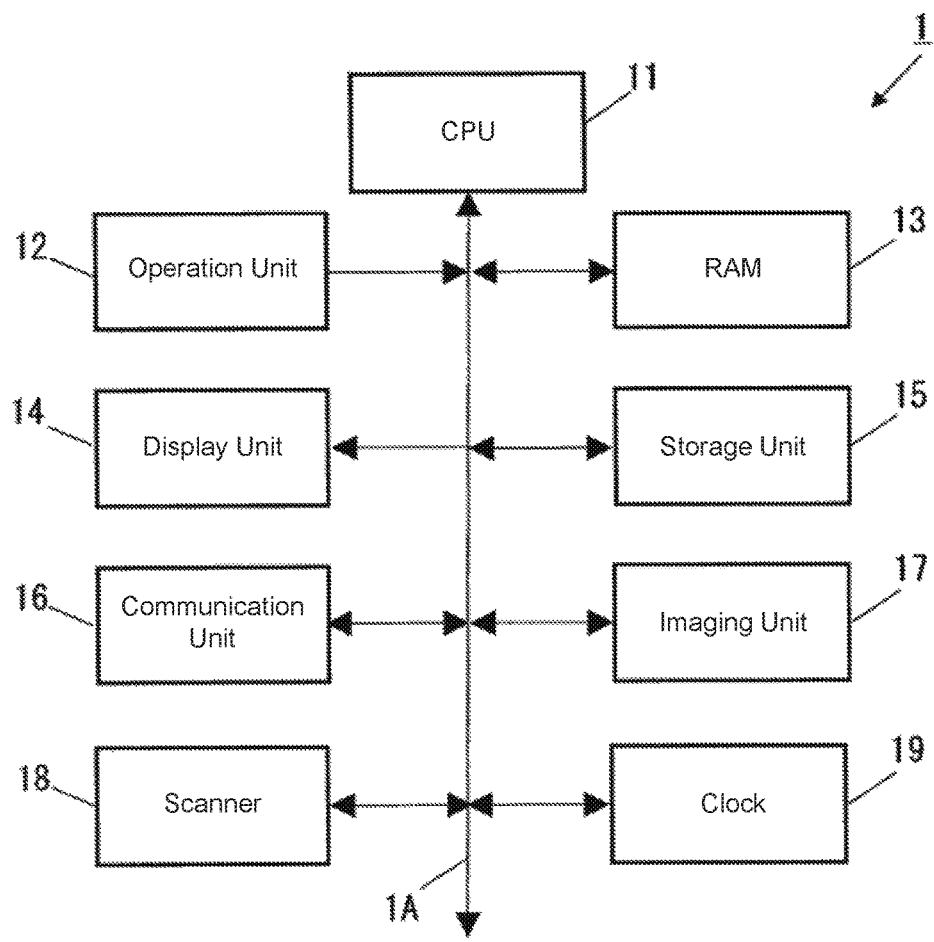
FIG. 2 is a block diagram illustrating the physical configuration of the slip processing device.
Figure 3:
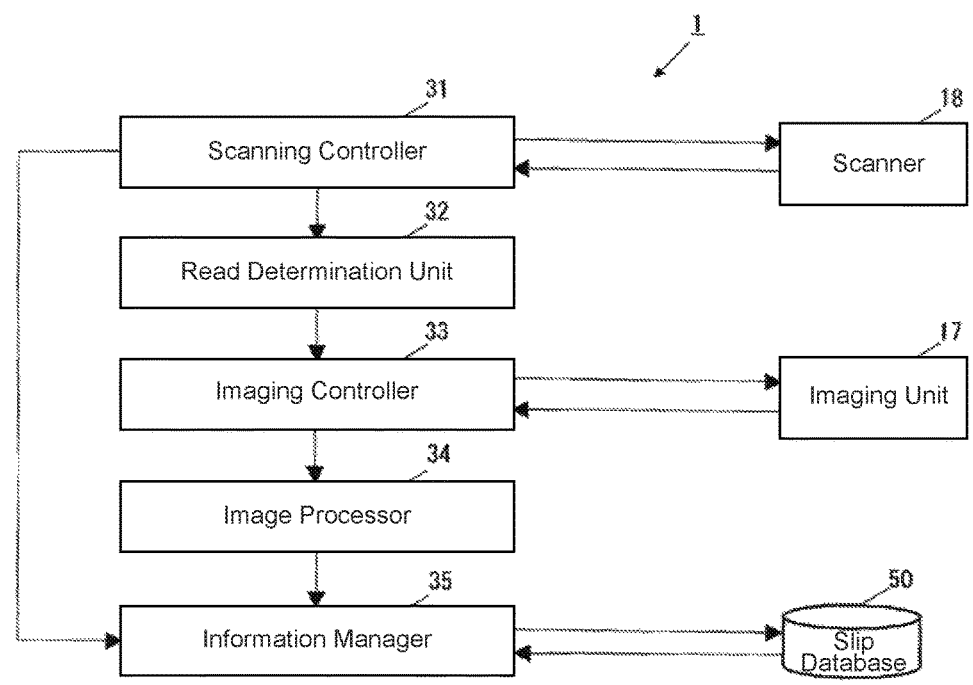
FIG. 3 is a block diagram illustrating the functional configuration of the slip processing device.

As illustrated in FIG. 2, the slip processing device 1 includes a central processing unit (CPU) (information acquiring unit; identification unit; image acquiring unit; storage unit) 11, an operation unit 12, a random-access memory (RAM) 13, the display unit 14, a storage unit 15, a communication unit 16, the imaging unit 17, the scanner 18, and a clock 19. The components of the slip processing device 1 are connected together via a bus 1A. The display unit 14, the imaging unit 17, and the scanner 18 are as described above and therefore will not be described again here.

The CPU 11 controls the components of the slip processing device 1. The CPU 11 loads specified programs from among system programs and application programs stored in the storage unit 15 and runs them using the RAM 13. The CPU 11 then uses the programs running on the RAM 13 to execute various processes.

The operation unit 12 is the operation keys 12A. The operation unit 12 may also include a touch panel provided on the screen of the display unit 14.

The RAM 13 is a volatile memory for temporarily storing information and has a working area for storing various types of data and programs.

The storage unit 15 includes a read-only memory (ROM) and a flash memory, for example, and stores various types of information such as an operating system, programs and applications, and a slip database (described below). Moreover, the storage unit 15 may include removable portable memory such as an SD card or an integrated circuit (IC) or may include a prescribed storage region on an external server (not illustrated in the figure) that can be accessed when connected to a network via a communication feature, for example.

The communication unit 16 includes components such as a wireless communication antenna, a transmission signal modulator, and a received signal demodulator and makes it possible to communicate wirelessly with an access point configured on a communication network, for example.

The clock 19 is a real-time clock that keeps the current date and time and outputs current time information that indicates that current date and time to the CPU 11.

Next, the functional configuration of the slip processing device 1 will be described with reference to FIG. 3. FIG. 3 is a block diagram illustrating the functional configuration of the slip processing device 1.

The slip processing device 1 includes a scanning controller 31, a read determination unit 32, an imaging controller 33, an image processor 34, and an information manager 35.

Upon receiving a scan trigger input from the user via the operation unit 12, the scanning controller 31 uses the scanner 18 to read the barcode on the target slip and obtain the identification information and then outputs the obtained identification information to the CPU 11. The read determination unit 32 determines whether the scanning controller 31 successfully obtained the identification information.

After the read determination unit 32 determines that the identification information has been successfully obtained, the imaging controller 33 controls the imaging unit 17 in order to obtain an image. Here, when the image is obtained, the clock 19 gets the current date and time so that the time at which the image was obtained can be recorded. In this way, when the user uses the scanner 18 to perform a scan, the slip processing device 1 requires no further input operations to obtain an image with the imaging unit 17.

The image processor 34 performs an image correction process on the obtained image. This image correction process will be described in more detail later but involves correcting the obtained image on the basis of the inclination of the barcode included therein so that the slip included in the image is horizontal. The information manager 35 associates the identification information obtained by the scanner 18 with the image obtained by the imaging unit 17 and then adds this data to a slip database 50 in the storage unit 15.

Figure 4:
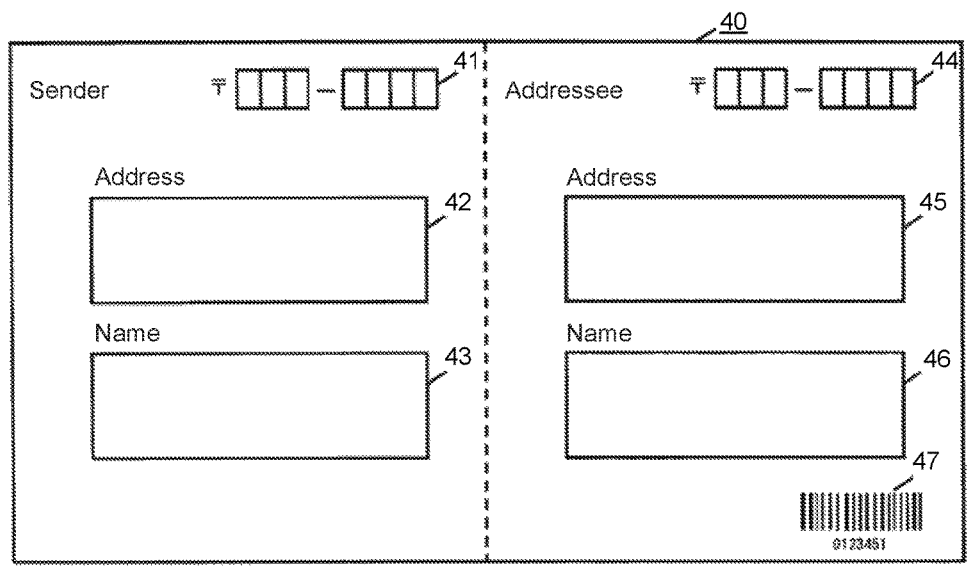
FIG. 4 illustrates an example of a slip to be processed.

Next, a slip to be processed by the slip processing device 1 will be described with reference to FIG. 4. FIG. 4 illustrates an example of a slip to be processed.

As illustrated in FIG. 4, here the slip to be processed by the slip processing device 1 is a shipping slip 40, for example, that has a horizontally elongated rectangular shape and includes the postal code 41, address 42, and name 43 of the shipping party (sender); the postal code 44, address 45, and name 46 of the addressee; and a barcode 47 printed in the lower right corner that serves as the identification information for each slip. Note, however, that the slip to be processed is not limited to being a shipping slip and may be any of various types of slips, and also note that the information included on the slip is not limited to the examples given here.

Figure 5:
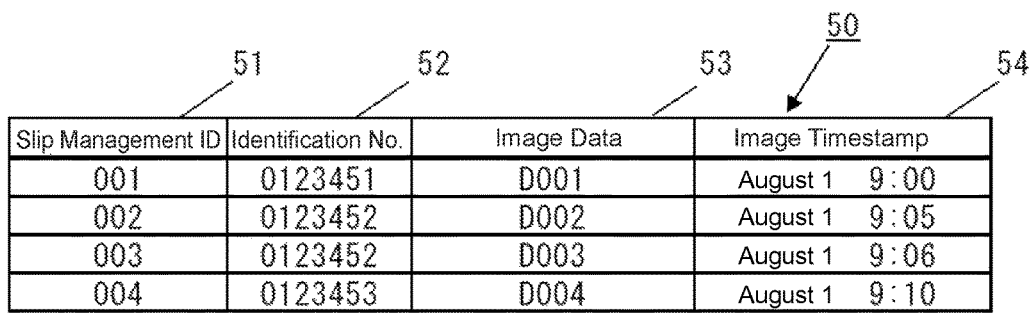
FIG. 5 illustrates a configuration of a slip database.

Next, the slip database 50 stored in the storage unit 15 will be described with reference to FIG. 5. FIG. 5 illustrates a configuration of the slip database 50.

As illustrated in FIG. 5, the slip database 50 includes the following data: slip management IDs 51, identification numbers 52, image data 53, and image timestamps 54.

The slip management IDs 51 are identification information that is assigned to each set of an identification number 52 and image data 53 (described below) and are used to manage the slips. A new slip ID 51 is assigned to each new set of data in the order in which that data is added to and stored in the slip database 50. The identification numbers 52 are identification numbers obtained from the barcode printed on each slip. The image data 53 is the data corresponding to the obtained images. The image timestamps 54 indicate the date and time at which the image data 53 was obtained.

In the slip database 50, a new slip ID 51 is assigned to and stored for each set of an identification number 52 and image data 53. Therefore, image data 53 that is obtained at different times but associated with the same identification number 52 will have different slip management IDs 51. For example, the two records in FIG. 5 with slip management IDs 51 of "002" and "003" have the same identification number 52 of "0123452" but different image data 53 of "D002" and "D003" and therefore have different slip management IDs 51 as well. In this way, when the barcode scan yields the same identification number 52, a plurality of shots of image data 53 can still be respectively associated with that identification number 52 and stored in the slip database 50.

The slip processing device 1 also makes it possible to search for and view data stored in the slip database 50. When the user inputs a slip search instruction via the operation unit 12, a search screen is displayed on the display unit 14, thereby making it possible to search for slips using various search conditions. The identification numbers 52 may be used as the search condition, for example. In this case, the user can use the operation unit 12 or the scanner 18 to input an identification number 52 on the search screen, and then the image data 53 and image timestamp 54 for the slip corresponding to that identification number 52 are displayed on the display unit 14. Note, however, that the search conditions used are not limited to being the identification numbers 52, and information about slips that were imaged during a prescribed period of time as determined from the image timestamps 54 may be displayed on the display unit 14 instead. Alternatively, a configuration that makes it possible to perform image searches by referencing characteristic properties of the image data 53 may be used.

Figure 6:
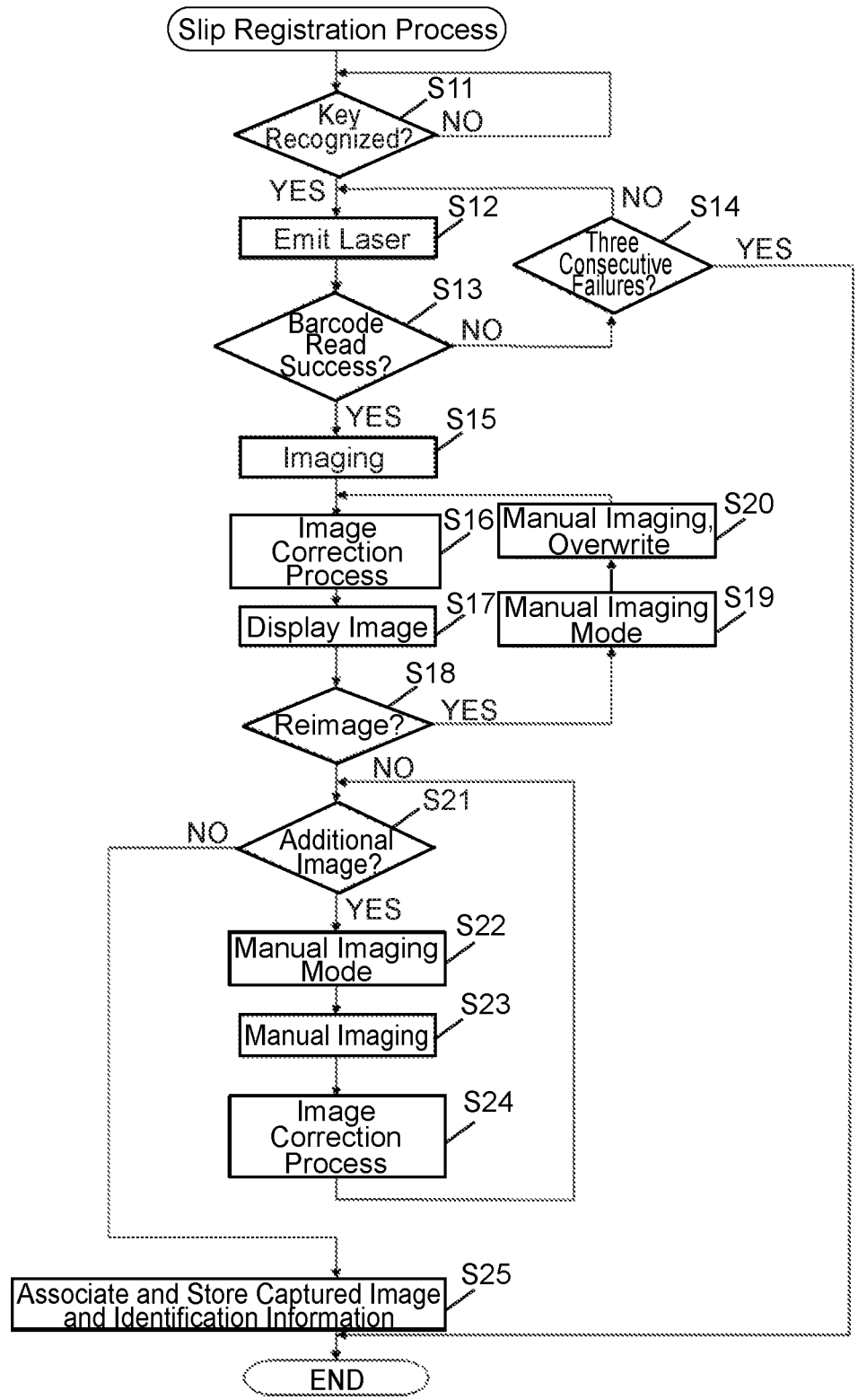
FIG. 6 is a flowchart illustrating a slip registration process.

Next, the flow of a slip registration process will be described with reference to FIG. 6. FIG. 6 is a flowchart illustrating the slip registration process. In the slip registration process, data such as the identification number 52 and image data 53 of a slip to be registered are obtained using the scanner 18 and the imaging unit 17 and then associated with one another and added to the slip database 50.

First, in step S11, the CPU 11 waits for user input to a trigger key for performing a barcode scan. Once the trigger key receives input (YES in step S11), the CPU 11 proceeds to step S12 and makes the scanner 18 emit a laser for scanning the barcode. Then, in step S13, the user irradiates the barcode on the target slip with the laser, and the CPU 11 determines whether the barcode has been successfully read. In other words, the CPU 11 functions as the scanning controller 31 and the read determination unit 32.

If it is determined that the identification number 52 was not successfully obtained from the barcode scan (NO in step S13), it is determined whether obtaining of the identification number 52 has failed three consecutive times (step S14). If it is determined that the obtaining of the identification number 52 has failed three consecutive times (YES in step S14), the slip registration process ends. Meanwhile, if there have not been three consecutive failures (NO in step S14), laser irradiation continues until the identification number 52 is obtained. The consecutive failure number does not necessarily need to be three, and can be set as appropriate. Conversely, if the identification number 52 is successfully obtained from the barcode scan (YES in step S13), the CPU 11 uses the imaging unit 17 to obtain the image triggering the obtaining of the identification number 52. In this way, the user's single barcode scan action results in the two steps of reading the barcode 47 and obtaining an image of the slip 40. Moreover, when the image is obtained, the clock 19 obtains the current time so that an image timestamp 54 can be registered to the slip database 50. Image timestamps 54 are obtained in the same manner during the other imaging processes in the steps described below as well. In other words, the CPU 11 functions as the imaging controller 33.

Next, the CPU 11 performs an image correction process (described below) on the obtained image (step S16). Then, the image corrected by the image correction process is displayed on the display unit 14 (step S17). In other words, the CPU 11 functions as the image processor 34.

After displaying the image corrected by the image correction process on the display unit 14, the CPU 11 waits for user input specifying whether the image needs to be reimaged (step S18). Upon receiving user input specifying that the displayed image needs to be reimaged (YES in step S18), the CPU 11 causes the device to transition to a manual imaging mode (step S19). Here, "manual imaging mode" is a mode in which the user can freely point the imaging unit 17 at the object to be imaged and then, after fitting the object within the camera's angle of view, input an image capturing trigger via the operation unit 12 to obtain an image of the object.

Next, when the user has reimaged an image, the image reimaged before the reimaging step is overwritten with the reimaged image (step S20). After overwriting the old image, the CPU 11 returns to step S16 and performs the image correction process again, but this time on the reimaged image.

Meanwhile, upon receiving user input specifying that the image does not need to be reimaged (NO in step S18), the CPU 11 receives user input specifying whether any additional images need to be obtained (step S21). Upon receiving user input specifying that an additional image needs to be obtained (YES in step S21), the CPU 11 causes the device to transition into the manual imaging mode (step S22) and then allows the user to manually obtain an image (step S23). Next, the CPU 11 performs the image correction process on the obtained image (step S24) and then repeats these steps until no more additional images are needed.

Upon receiving input specifying that no additional images need to be obtained (NO in step S21), the CPU 11 associates the obtained image data 53 with the identification number 52 obtained from the barcode scan, and then stores this data in the slip database 50 in the storage unit 15. If multiple shots of image data 53 were obtained, each obtained shot of image data 53 is respectively associated with the identification number 52 and added to the slip database 50. In other words, the CPU 11 functions as the information manager 35.

Figure 7:
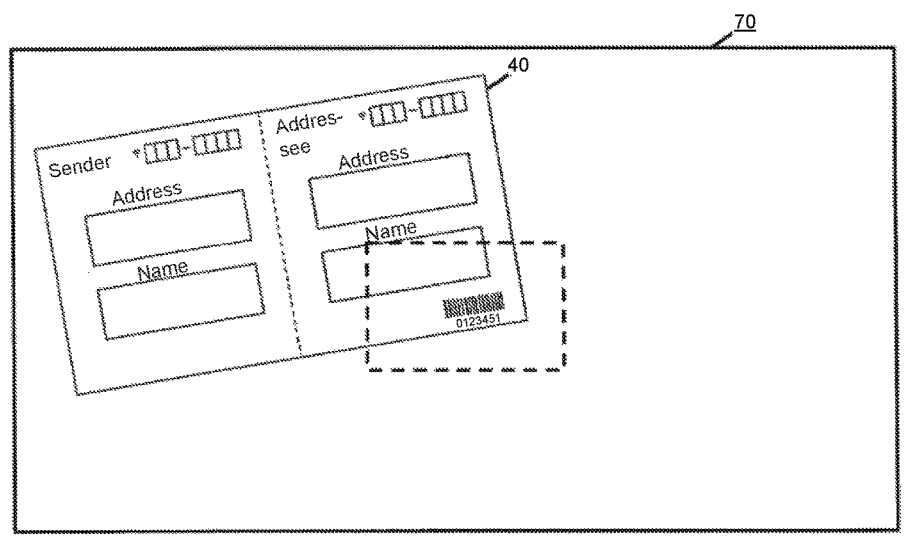
FIG. 7 illustrates an example of an image prior to an image correction process.

Next, the image correction process will be described with reference to FIGS. 7 to 10. First, an example of an image prior to the image correction process will be described. FIG. 7 illustrates the example of the image prior to the image correction process.

As illustrated in FIG. 7, the pre-corrected image 70 for the image correction process has a horizontally elongated rectangular shape. The pre-corrected image 70 illustrated in FIG. 7 includes the slip 40 on which a barcode is printed, but the slip 40 is tilted relative to the edges of the pre-corrected image 70.

Moreover, the barcode 47 of the slip 40 is positioned near the center of the pre-corrected image 70. This is because the positional relationship between the scanner 18 and the imaging unit 17 is configured such that the barcode printed on the slip will be positioned near the center of the image when the image is obtained in step S15 in FIG. 6.

In the present embodiment, performing the horizontal correction processing as the image correction process horizontally corrects the image in which the slip 40 is inclined. During this time, the inclination of the barcode appearing in the image is used. Specifically, the inclination of the barcode with respect to the image is detected, and correction is performed on the entire image on the basis of this inclination. This is because, in general, the barcodes included on objects such as slips or goods are almost always attached such that when the object is arranged horizontally the barcode is also horizontal; therefore, horizontal correction of the barcode with respect to the image can be expected to eliminate inclinations on the image and object.

Figure 8:
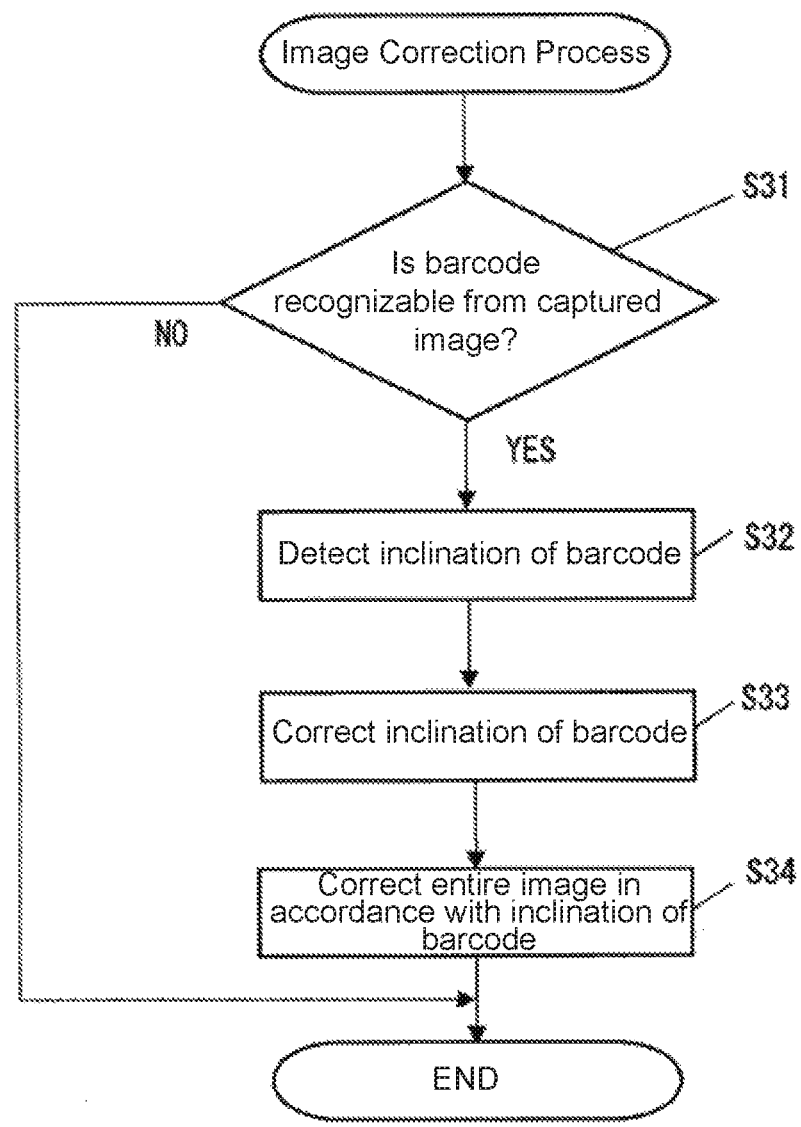
FIG. 8 is a flowchart illustrating the image correction process.

Next, the flow of the image correction process will be described with reference to FIG. 8. FIG. 8 is a flowchart illustrating the image correction process.

First, in step S31, the CPU 11 determines whether the barcode 47 is recognizable within the image for the image correction process. Note that in Embodiment 1, there is a high probability that the barcode 47 is positioned near the center of the pre-corrected image 70, and therefore during this recognition process the CPU 11 may search just near the center of the pre-corrected image 70 rather than having to search the entire image.

If no barcode 47 is recognized (NO in step S31), no correction is applied to the pre-corrected image 70, and the image correction process is ended. In other words, the image correction process is not applied to images that do not contain the barcode 47.

Figure 9:
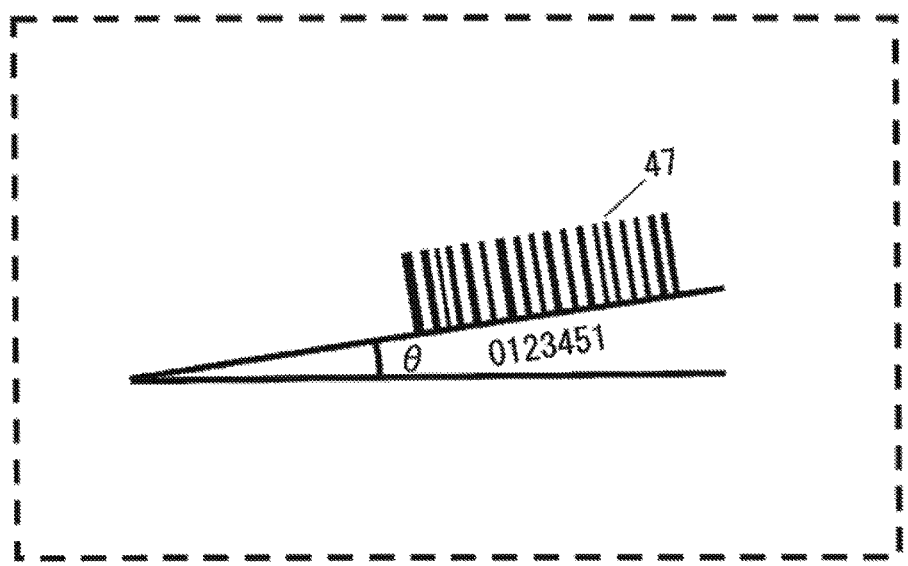
FIG. 9 illustrates the inclination of a barcode.

Conversely, if the barcode 47 is recognized within the pre-corrected image 70 (YES in step S31), the CPU 11 proceeds to step S32 and detects the inclination of the barcode 47 within the pre-corrected image 70. Here, as illustrated in FIG. 9, the inclination of the barcode 47 is given by the angle $\theta$, which represents the angle between the barcode 47 and the bottom edge of the pre-corrected image 70.

Figure 10:
FIG. 10 illustrates the barcode after the image correction process.

Next, the CPU 11 proceeds to step S33 and corrects the inclination of the barcode 47 according to the detected inclination $\theta$ of the barcode. Here, as illustrated in FIG. 10, after the inclination of the barcode is corrected, the barcode is parallel to the bottom edge of the pre-corrected image 70 (in other words, the angle $\theta$ is equal to 0). Then, after correcting the inclination of the barcode 47, the CPU 11 proceeds to step S34 and corrects the overall image according to the inclination of the barcode 47.

Figure 11:
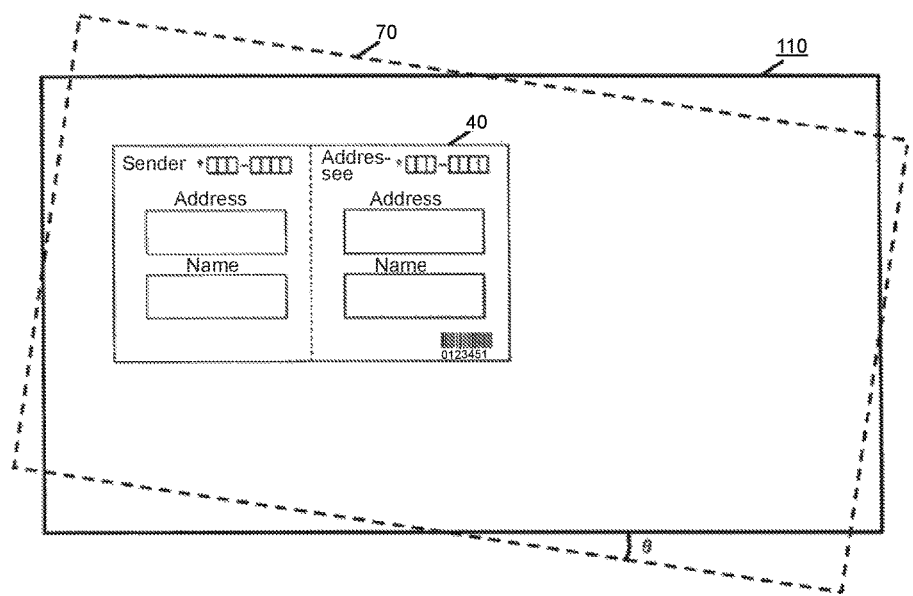
FIG. 11 illustrates an example of an image after the image correction process.

FIG. 11 illustrates the obtained image after the image correction process. Here, tilting the pre-corrected image 70 by the angle $\theta$ in the same direction in which the inclination of the barcode 47 was corrected makes it possible to generate the corrected image 110, in which the inclination of the slip itself is corrected.

Moreover, as illustrated in FIG. 11, the barcode 47 of the slip 40 is positioned near the center of the corrected image 110, and thus the overall slip 40 is positioned off-center. Therefore, the corrected image 110 may be further processed (such as by trimming the corrected image 110 to an appropriate size) such that the slip 40 is centered in the corrected image 110.

Embodiment 2

In Embodiment 1, a process such as trimming must be applied to the obtained image due to the slip 40 being positioned off-center. As a countermeasure, in Embodiment 2, the laser irradiation area of the barcode scanner is adjusted in accordance with the position of the barcode 47 printed on the slip 40 in order to ensure that the slip 40 is included at an appropriate position within the angle of view of the imaging unit 17.

The configuration of a slip processing device 1 according to Embodiment 2 is the same as the configuration described in Embodiment 1, and therefore a description of the configuration will be omitted here, and only the operation of Embodiment 2 will be described below.

Next, the process of setting the laser irradiation area in Embodiment 2 will be described with reference to FIGS. 12 to 14.

Figure 12:
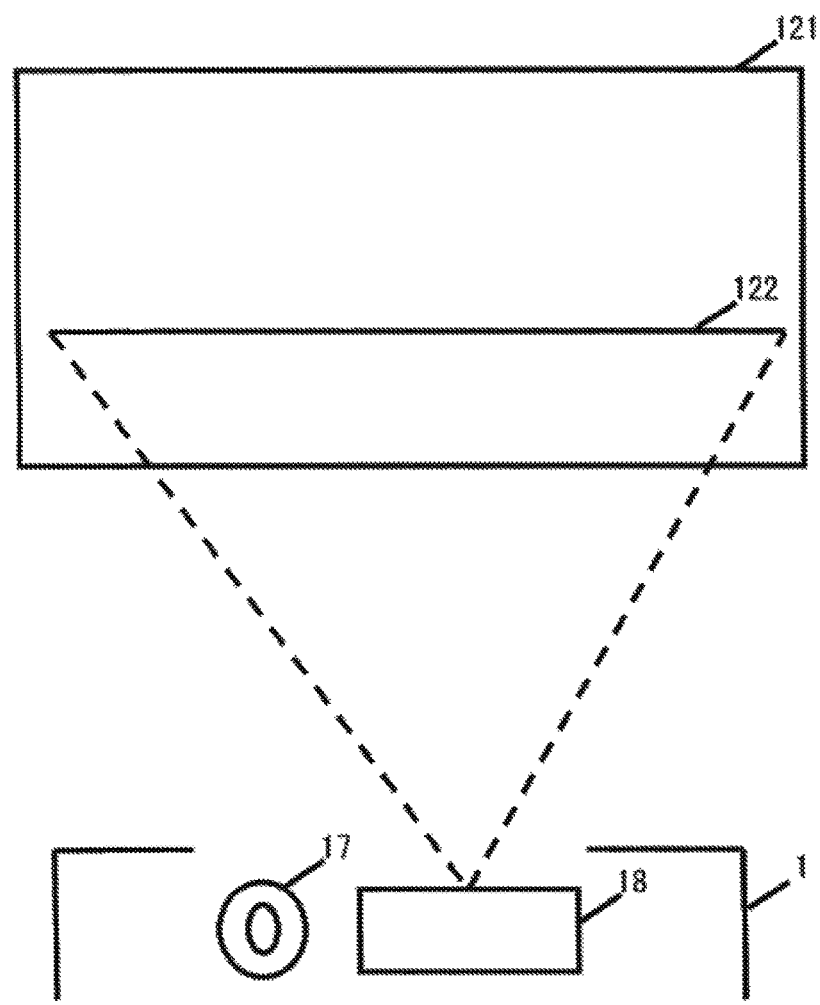
FIG. 12 illustrates an imaging unit imaging area and a barcode scanner scanning area.

FIG. 12 illustrates an imaging area of the imaging unit 17 and a barcode scanner scanning area.

As illustrated in FIG. 12, the slip processing device 1 includes a scanner 18 and an imaging unit 17 and can obtain images of an imaging area 121 that is included within the angle of view of the imaging unit 17 as well as scan barcodes within a laser irradiation area 122 of the scanner 18. In this slip processing device 1, similar to in Embodiment 1 as described above, once the scanner 18 is used to scan a barcode, the imaging unit 17 is then used to obtain an image. Moreover, the imaging unit 17 and the scanner 18 are arranged to achieve a positional relationship that ensures that the irradiation area 122 is always contained within the imaging area 121.

First, the process of imaging a slip prior to setting the laser irradiation area will be described with reference to FIG. 13. FIG. 13 illustrates using the slip processing device 1 to perform a barcode scan on and obtain an image of a slip 40 that has a barcode 47 in the lower right corner.

Figure 13:
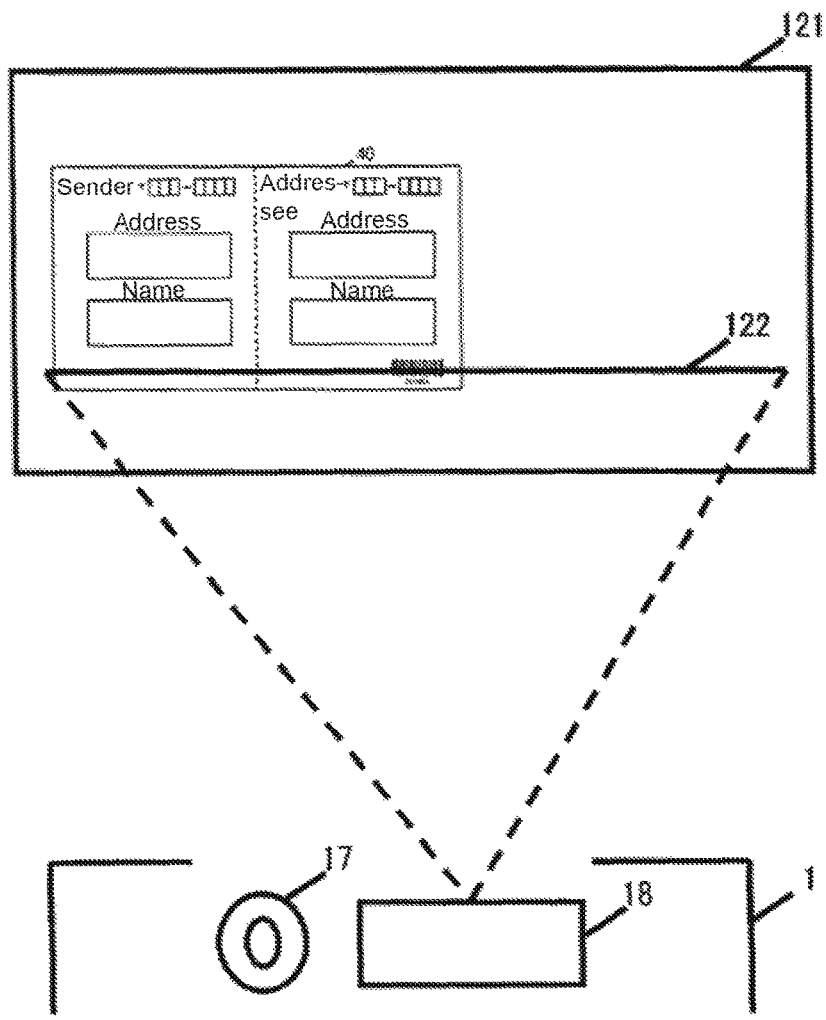
FIG. 13 illustrates imaging a slip prior to setting a laser irradiation area.

As illustrated in FIG. 13, if the barcode scan is performed while the barcode 47 is positioned near the center of the scannable irradiation area 122 and while the laser irradiation area has not been set, for example, the slip 40 will be positioned off-center to the left in the imaging area 121. This is because the barcode 47 is in the lower right corner of the slip 40, and therefore if the barcode 47 is scanned while positioned in the center of the irradiation area 122, the barcode 47 will also be positioned near the center of the obtained image, thereby resulting in the slip 40 being positioned off-center to the left.

Therefore, in Embodiment 2 the irradiation area 122 is explicitly set. Next, the process of imaging the slip after setting the laser irradiation area will be described with reference to FIG. 14. FIG. 14 illustrates imaging the slip 40 with the irradiation area 122 set to the optimal setting.

Figure 14:
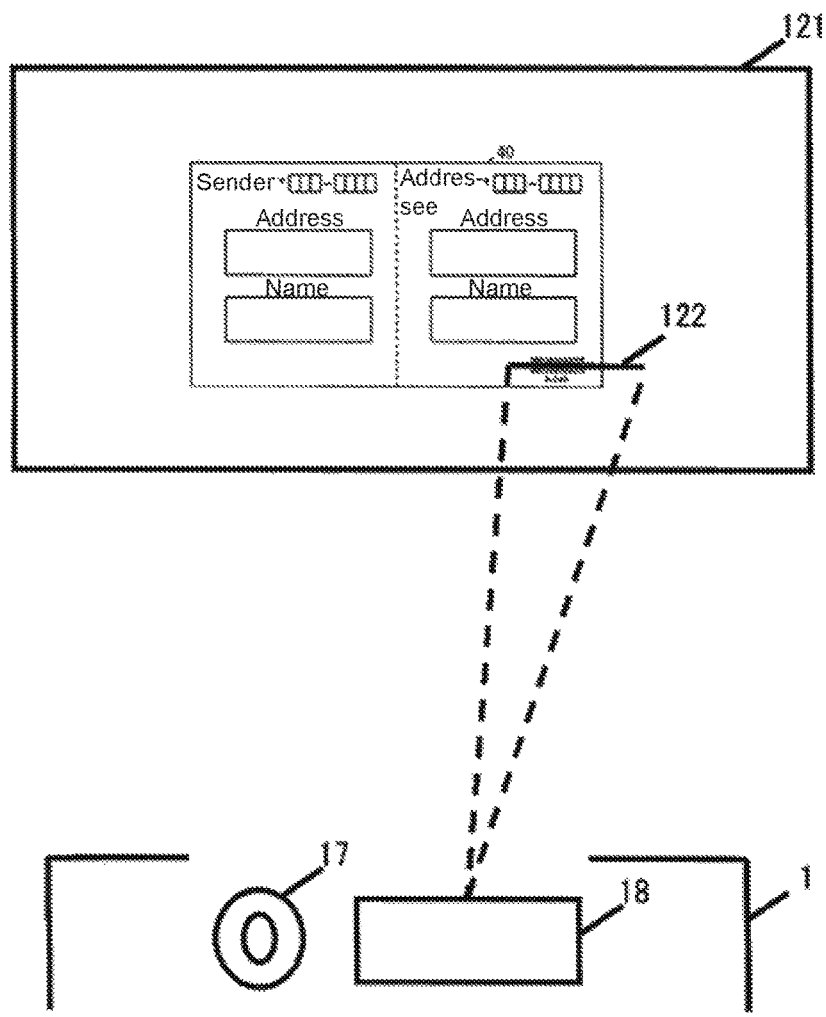
FIG. 14 illustrates imaging a slip after setting the laser irradiation area.

As illustrated in FIG. 14, the CPU 11 controls the irradiation area 122 of the scanner 18 according to the preregistered position of the barcode 47. When the barcode 47 is in the lower right corner of the slip 40, the irradiation area 122 is set as illustrated in FIG. 14. When the user then performs the scan with the irradiation area 122 set in this manner, this makes it possible to obtain an image in which the slip 40 is positioned near the center of the imaging area 121, as illustrated in FIG. 14.

When setting the irradiation area 122, the irradiation area 122 was controlled by registering the position of the barcode 47 in advance, but is not limited to this. There may be a mechanism whereby the user sets the irradiation area 122 by selecting both the irradiation position and irradiation width of the laser, for example. Specifically, the user could set the irradiation area 122 with ease by selecting from irradiation positions of left/middle/right and irradiation widths of short/medium/long as necessary. Moreover, by adding a configuration in which the angle in the vertical direction of the scanner 18 can be chosen from top/middle/bottom, it would be possible to obtain an image in which the slip appears in the center of the image area 121 no matter where on the two-dimensional plane the barcode is printed on the slip 40. When the user selects the irradiation position and the irradiation width, the coordinates of the start point and end point of the irradiation position may be set. This allows a more defined irradiation area 122 to be set.

Furthermore, the laser irradiation area 122 may be controlled based on the positional relationship of the slip 40 and the barcode by obtaining the slip 40 with the imaging unit 17 and determining where the barcode is on the slip via image analysis. Thus, by using the imaging unit 17, it is possible to omit necessary procedures when setting the irradiation area 122.

A slip registration process and an image correction process in Embodiment 2 are the same as those described in Embodiment 1. In Embodiment 2, emitting the laser set as described above in step S12 of the slip registration process illustrated in FIG. 6 makes it possible to obtain an image in which the slip is centered.

As described above, in the present embodiment, the slip processing device 1 uses a scan of the barcode on a target object and gets identification information about the target object, determines whether the identification information was successfully obtained, uses an imaging unit to image the target object upon it being determined that the identification information was successfully obtained, obtains an image of the target object, and then associates together and stores the identification information and the image.

In other words, the slip processing device 1 includes an information obtaining unit, a determination unit, an image obtaining unit, and a storage unit.

This makes it possible to provide a slip processing device and recording medium that make it possible to collect information more easily.

Furthermore, in the slip processing device 1, an imaging direction of the imaging unit and a laser emission direction of the barcode scanner are set to be in the same direction. This makes it easy to fit the slip within the angle of view of the imaging unit and then obtain the image.

In addition, the slip processing device 1 determines whether a barcode is present within the obtained slip image, and, upon determining that a barcode is present, detects an inclination of the barcode, applies a horizontal correction process to the slip image in accordance with the detected inclination, and then associates together and stores the obtained identification number and the processed slip image. This makes it possible to save images of various types of slips in a way that is easier for users to view.

Moreover, the slip processing device 1 changes a laser irradiation area for the barcode scan in accordance with a position of the barcode printed on the slip in order to control a scanning area such that the slip fits within a prescribed region of an angle of view of the imaging unit. This makes it easy to center various types of slips within the angle of view of the imaging unit when obtaining images of the slips.

Furthermore, the slip processing device 1 displays the obtained slip image, waits for input specifying whether the slip image needs to be reimaged, and, upon receiving input specifying that the slip image does need to be reimaged, transitions to an imaging mode for using the imaging unit to reimage the slip image. This allows the user to quickly verify the state of the image and to easily reimage the image when necessary.

In addition, the slip processing device 1 waits for input specifying whether any other images need to be obtained in addition to the already obtained slip image (a first slip image), and, upon receiving input specifying that additional images do need to be obtained, transitions to an imaging mode for using the imaging unit to obtain at least one additional image and then respectively associates together and saves a slip image obtained in the imaging mode and the first slip image with the identification number. This makes it possible to respectively associate and save a plurality of images with the identification number.

Note that the embodiment described above is only an example of a slip processing device, slip processing method, and recording medium according to the present invention, and the present invention is not limited to this example.

For example, in the embodiment described above, the slip database 50 is configured to include the following data: slip management IDs 51, identification numbers 52, image data 53, and image timestamps 54. However, the present invention is not limited to this example and may be configured to appropriately prepare any data needed to process slips.

Moreover, although the barcode scanner in the embodiment described above is a one-dimensional barcode scanner, the present invention is not limited to this example and may be configured to include a two-dimensional barcode scanner, for example.

Furthermore, in the embodiment described above, added data is stored in the storage unit 15 of the slip processing device 1. However, the present invention is not limited to this example and may instead send the data via the communication unit 16 to a server that then handles data storage and management, for example. Moreover, the present invention may be configured to be able to share data from a plurality of the slip processing devices 1 and the storage units 15 via the communication units 16.

In addition, although the image correction process is applied to obtained images in the embodiment described above, a user setting may be provided to allow the user to select whether to apply the image correction process. Similarly, user settings may be provided to allow to user to disable, as appropriate, whether the device waits for input specifying whether images need to be reimaged or whether the device waits for input specifying whether additional images need to be obtained.

Moreover, in the image correction process in the embodiment described above, the inclination of the overall image is corrected after first correcting the inclination of the barcode. However, the present invention is not limited to this example and may be configured to simply detect the inclination of the barcode and then immediately correct the overall image in accordance with this detected inclination.

Although an embodiment of the present invention was described above, the present invention is not limited to this embodiment and also includes any configurations encompassed within the scope of the claims and their equivalents. It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A handheld device for slip processing, comprising:
an imaging unit that images an object;
a barcode scanner that reads a one-dimensional barcode;
a storage unit; and
a processor configured to perform the following:
causing the barcode scanner to scan a one-dimensional barcode on a slip to obtain identification information on the slip;
determining whether the obtaining of the identification information has succeeded;
when the obtaining of the identification information has succeeded, causing the imaging unit to image the slip to obtain a slip image;
determining whether the one-dimensional barcode is present within the slip image that has been obtained, and, when it is determined that the one-dimensional barcode is present, detecting an inclination of the one-dimensional barcode and then causing a horizontal correction process to be applied to the slip image in accordance with the inclination that has been detected; and
causing the identification information that has been obtained and the slip image that has been corrected by said horizontal correction process to be stored in association with each other in the storage unit.

2. The handheld device according to claim 1, wherein an imaging direction of the imaging unit and a laser emission direction of the barcode scanner are set to be a same direction.

3. The handheld device according to claim 1, wherein the processor is configured to perform the following:
changing a laser irradiation area of the barcode scanner in accordance with a position of the one-dimensional barcode on the slip so that the slip fits within a prescribed region in an angle of view of the imaging unit.

4. The handheld device according to claim 1, wherein the processor is configured to perform the following:
causing the slip image that has been obtained to be displayed on the handheld device and receiving input from a user specifying whether the slip image needs to be reimaged, and, when the input specifying that the slip image needs to be reimaged has been received, causing the imaging unit to perform reimaging.

5. The handheld device according to claim 1, wherein the processor is configured to perform the following:
receiving input specifying whether an additional image needs to be imaged in addition to the slip image that has already been obtained, and, when input specifying that the additional image needs to be imaged has been received, causing the imaging unit to perform additional imaging,
wherein the processor causes the slip image and the additional image to be both stored in association with the identification information in the storage unit.

6. The handheld device according to claim 1, wherein the processor determines a time at which the slip image was imaged and causes said time to be stored in the storage unit together with the slip image and the identification information associated thereto.

7. The handheld device according to claim 1, wherein the barcode scanner is a one-dimensional barcode scanner.

8. The handheld device according to claim 1, wherein the identification information is an identification number.

9. A handheld device, comprising:
an imaging unit that images an object;
a barcode scanner that reads a one-dimensional barcode;
a storage unit; and
a processor configured to perform the following:
causing the barcode scanner to scan a one-dimensional barcode on a slip to obtain identification information on the slip;
determining whether the obtaining of the identification information has succeeded;
when the obtaining of the identification information has succeeded, causing the imaging unit to image the slip to obtain a slip image; and
causing the identification information that has been obtained and the slip image that has been obtained to be stored in association with each other in the storage unit,
wherein the processor is configured to receive identification information from a user and scan the storage unit for the slip image that has been stored in association with the received identification information, thereby performing a search for the slip image using the identification information as a search parameter.

10. A slip processing method to be performed by a handheld device for slip processing that includes an imaging unit that images an object; a barcode scanner that reads a one-dimensional barcode; a storage unit; and a processor, the slip processing method comprising, via said processor:
causing the barcode scanner to scan a one-dimensional barcode on a slip to obtain identification information on the slip;
determining whether the obtaining of the identification information has succeeded;
after the obtaining of the identification information has succeeded, causing the imaging unit to image the slip to obtain a slip image;
determining whether the one-dimensional barcode is present within the slip image that has been obtained, and, when it is determined that the one-dimensional barcode is present, detecting an inclination of the one-dimensional barcode and then causing a horizontal correction process to be applied to the slip image in accordance with the inclination that has been detected; and
causing the identification information that has been obtained and the slip image that has been corrected by said horizontal correction process to be stored in association with each other in the storage unit.

11. The slip processing method according to claim 10, further comprising:
changing a laser irradiation area of the barcode scanner in accordance with a position of the one-dimensional barcode on the slip so that the slip fits within a prescribed region in an angle of view of the imaging unit.

12. The slip processing method according to claim 10, further comprising:
 causing the slip image that has been obtained to be displayed on the handheld device and receiving input from a user specifying whether the slip image needs to be reimaged, and, when the input specifying that the slip image needs to be reimaged has been received, causing the imaging unit to perform reimaging.

13. The slip processing method according to claim 10, further comprising:
 receiving input specifying whether an additional image needs to be imaged in addition to the slip image that has already been obtained, and, when input specifying that the additional image needs to be imaged has been received, causing the imaging unit to perform additional imaging,
 wherein in the step of storing, the slip image and the additional image are stored in association with the identification information in the storage unit.

14. The slip processing method according to claim 10, further comprising, via the processor:
 determining a time at which the slip image was imaged; and
 storing said time in the storage unit together with the slip image and the identification information associated thereto.

15. The slip processing method according to claim 10, wherein the identification information is an identification number.

16. A non-transitory computer-readable recording medium having stored therein instructions executable by a processor in a handheld device for slip processing, the handheld device including an imaging unit that images an object; a barcode scanner that reads a one-dimensional barcode; a storage unit; and said processor, the instructions causing the processor to perform the following:
 causing the barcode scanner to scan a one-dimensional barcode on a slip to obtain identification information on the slip;
 determining whether the obtaining of the identification information has succeeded;
 after the obtaining of the identification information has succeeded, causing the imaging unit to image the slip to obtain a slip image;
 determining whether the one-dimensional barcode is present within the slip image that has been obtained, and, when it is determined that the one-dimensional barcode is present, detecting an inclination of the one-dimensional barcode and then causing a horizontal correction process to be applied to the slip image in accordance with the inclination that has been detected; and
 causing the identification information that has been obtained and the slip image that has been corrected by said horizontal correction process to be stored in association with each other in the storage unit.

* * * * *